US010190592B2

(12) United States Patent
Le Louedec et al.

(10) Patent No.: US 10,190,592 B2
(45) Date of Patent: Jan. 29, 2019

(54) TURBOPUMP WITH ANTI-VIBRATION SYSTEM

(71) Applicant: ARIANEGROUP SAS, Paris (FR)

(72) Inventors: Dominique Le Louedec, Saint Marcel (FR); Guillaume Chemla, Versailles (FR); Philippe Even, Sainte Genevieve les Gasny (FR); Frederick Millon, La Croix St Leufroy (FR); Laurent Collongeat, Vernon (FR)

(73) Assignee: ARIANEGROUP SAS, Paris (FR)

( * ) Notice: Subject to any disclaimer, the term of this patent is extended or adjusted under 35 U.S.C. 154(b) by 294 days.

(21) Appl. No.: 14/892,867

(22) PCT Filed: May 14, 2014

(86) PCT No.: PCT/FR2014/051119
§ 371 (c)(1),
(2) Date: Nov. 20, 2015

(87) PCT Pub. No.: WO2014/188109
PCT Pub. Date: Nov. 27, 2014

(65) Prior Publication Data
US 2016/0169240 A1 Jun. 16, 2016

(30) Foreign Application Priority Data

May 20, 2013 (FR) ..................... 13 54511

(51) Int. Cl.
*F04D 29/04* (2006.01)
*F04D 27/00* (2006.01)
(Continued)

(52) U.S. Cl.
CPC ............ *F04D 27/009* (2013.01); *F01D 11/06* (2013.01); *F01D 25/04* (2013.01); *F02K 9/48* (2013.01);
(Continued)

(58) Field of Classification Search
CPC ....... F04D 27/009; F04D 17/10; F04D 25/045; F01D 11/06; F01D 25/04; F02K 9/48; F02K 9/566; F05D 2260/96
See application file for complete search history.

(56) References Cited

U.S. PATENT DOCUMENTS

| 2,839,005 A | 6/1958 | Means |
| 3,237,401 A * | 3/1966 | Peters ..................... F02C 1/007 |
| | | 60/246 |

(Continued)

FOREIGN PATENT DOCUMENTS

| EP | 0 222 262 A1 | 5/1987 |
| EP | 1 672 270 A2 | 6/2006 |

(Continued)

OTHER PUBLICATIONS

English Translation of FR2964425A1 (Danguy, Mar. 2012).*
International Search Report dated Jul. 25, 2014 for PCT/FR2014/051119 Filed May 14, 2014.

*Primary Examiner* — Justin Seabe
(74) *Attorney, Agent, or Firm* — Oblon, McClelland, Maier & Neustadt, L.L.P.

(57) ABSTRACT

A turbopump includes a turbine fed with hot gas, a pump driven by the turbine and fed with liquid fluid, and a hot gas exhaust pipe situated downstream from the turbine. The turbopump includes a bleed-and-injection circuit including a bleeder for bleeding the liquid fluid at the outlet from the pump, a heater for heating the liquid fluid as bled off in this way so as to transform it into gaseous fluid, and an injector for injecting the gaseous fluid into an interface region of the turbopump situated between the pump and the turbine, so as to optimize the flow and temperature conditions of the fluid entering into the turbine cavity in order to eliminate the vibratory phenomena that result from interaction between the fluid and the turbine disk.

14 Claims, 3 Drawing Sheets

(51) Int. Cl.
*F01D 11/06* (2006.01)
*F01D 25/04* (2006.01)
*F02K 9/48* (2006.01)
*F02K 9/56* (2006.01)
*F04D 17/10* (2006.01)
*F04D 25/04* (2006.01)

(52) U.S. Cl.
CPC .............. *F02K 9/566* (2013.01); *F04D 17/10* (2013.01); *F04D 25/045* (2013.01); *F05D 2260/96* (2013.01)

(56) References Cited

U.S. PATENT DOCUMENTS

| 4,744,721 | A | 5/1988 | Villeneuve |
| 6,991,235 | B2 * | 1/2006 | Ebert ................... F01D 11/003 277/355 |
| 2006/0222523 | A1 | 10/2006 | Valentian et al. |
| 2013/0227931 | A1 | 9/2013 | Danguy et al. |
| 2013/0305686 | A1 | 11/2013 | Conrardy et al. |

FOREIGN PATENT DOCUMENTS

| FR | 2 964 425 A1 | 3/2012 |
| FR | 2 967 725 A1 | 5/2012 |

* cited by examiner

TURBOPUMP WITH ANTI-VIBRATION SYSTEM

BACKGROUND OF THE INVENTION

The invention relates to a turbopump comprising a turbine fed with hot gas, a pump driven by the turbine and fed with liquid fluid, and a hot gas exhaust pipe situated downstream from the turbine.

Such turbopumps are known, e.g. for feeding propellant to the combustion chamber of a rocket engine.

By way of example, Document EP 1 672 270 in the name of the Applicant describes a turbopump in accordance with the precharacterizing portion of claim 1.

The turbine drives the pump (or more precisely the rotor portion of the pump) at speeds that can be very high and can reach several thousands of revolutions per minute. Consequently, the component elements of the turbopump are subjected to high levels of stress and of vibration. In certain circumstances, the frequencies of such vibration can correspond to resonant modes of certain elements of the turbopump, and in particular of certain parts of the turbine, which can lead to the parts concerned being damaged. Such vibration has a negative impact on the operation of the turbopump and on its lifetime.

In particular, it has been observed that high levels of vibration affect the upstream parts of the turbine (first disk of the turbine that is close to the pump). If this vibration is not damped sufficiently, the vibratory phenomenon can become large, thereby leading to significant damage to the first disk of the turbine, or indeed to destruction of the turbine.

OBJECT AND SUMMARY OF THE INVENTION

The invention seeks to limit the vibration that occurs in the turbopump, in particular the vibration that affects the upstream parts of the turbine, i.e. the parts close to the pump.

This object is achieved by the fact that the above-mentioned turbopump includes a bleed-and-injection circuit comprising bleed means for bleeding the liquid fluid at the outlet from the pump, heater means for heating the liquid fluid as bled off in this way so as to transform it into gaseous fluid, and injector means for injecting the gaseous fluid into an interface region of the turbopump situated between the pump and the turbine.

Research has made it possible to have better understanding of the origin of the vibration affecting the upstream parts of the turbine. To clarify the explanations below, it is assumed that these upstream parts are constituted mainly by the first disk of the turbine.

Even if particular care is given to the connection between the pump and the turbine, in particular in terms of sealing, small leaks of the pumped liquid fluid occur, such that small quantities of the liquid fluid coming from the pump penetrate into the upstream portion of the casing of the turbine, in particular in the region of the first disk of the turbine.

Interaction has been revealed between this fluid coming from the pump and the first disk of the turbine. Energetic coupling occurs between this fluid coming from the pump, in which pressure pulses develop, and the first disk that starts vibrating at one of its resonant frequencies under the effect of these pressure pulses. In the absence of sufficient damping, this vibratory phenomenon can become large, thereby leading to significant damage of the disk or even to destruction of the turbine. The invention enables this vibration to be limited, thereby avoiding damage to the turbine.

Tests have shown that by modifying the thermodynamic conditions (flow rate, temperature) of the fluid coming from the pump and entering into the upstream portion of the pump casing, it is possible to reduce the amplitude of the vibratory phenomenon.

The inventors have had the idea of bleeding the liquid fluid at the outlet from the pump and of deliberately injecting it into the interface between the pump and the turbine after heating it. Thus, the bled-off and heated liquid fluid is injected in gaseous form into the interface between the pump and the turbine so as to mix in this location with the leakage liquid fluid, thereby causing a hotter fluid to enter into the turbine casing, thus having the effect of significantly reducing or even eliminating the phenomenon of interaction between the fluid coming from the pump and the first disk of the turbine that leads to vibration in the first disk of the turbine, as mentioned above.

The invention applies not only when the propellant is a cryogenic propellant, but also when the propellant is non-cryogenic. Either way, changing the temperature of the leakage fluid as a result of being mixed with the heated fluid modifies the thermodynamic conditions of the fluid in the desired direction.

Advantageously, the gaseous fluid is injected via a dynamic sealing system that is located in the interface region situated between the pump and the turbine.

The sealing system needs to be dynamic since it is mounted on a rotary shaft—the shaft that is common to the turbine and to the pump—in order to provide sealing between a hot environment in which the fluid is gaseous (turbine end) and the cryogenic environment in which the fluid is liquid (pump end).

The dynamic sealing system is situated in the interface region between the pump and the turbine.

The rotor of the pump is driven in rotation by the turbine so as to pump the propellant for injection into the combustion chamber of a rocket engine. In the context of the invention, and as often happens in the field of space propulsion, the fluid used as cryogenic propellant is liquid hydrogen.

Thus, advantageously, the turbine is fed with hot gas and the pump is fed with liquid hydrogen.

Advantageously, the bleed-and-injection circuit includes a bleed pipe extending from the outlet from the pump to the inlet of a heat exchanger co-operating with the exhaust pipe, and an injection pipe extending from the outlet of the heat exchanger to the interface region, in particular from the outlet of the heat exchanger to the dynamic sealing system.

Advantageously, the heat exchanger comprises a fluid flow chamber with a wall situated in the hot gas exhaust pipe.

For the purpose of heating the bled-off liquid, this makes it possible to use heat energy that is already available in the hot gas exhausted by the turbopump.

Advantageously, the flow chamber is coil shaped.

A coil provides a large contact surface area with the hot gas exhausted into the pipe in which the coil is situated.

Advantageously, the bleed-and-injection circuit includes means for controlling the flow of the liquid fluid in the bleed pipe.

To perform this control, which may be in the form of regulating pressure and/or flow rate in a manner defined by testing, the quantity of fluid that is bled off is a quantity that is necessary and sufficient for obtaining the desired reduction in vibration.

Advantageously, the means for controlling the flow of liquid fluid in the bleed pipe comprise means for adjusting the fluid pressure.

Advantageously, the bleed-and-injection circuit includes a bypass pipe for bypassing the heat exchanger between the bleed pipe and the injection pipe, and means for sharing the liquid fluid between the bypass pipe and the heat exchanger.

It is particularly advantageous to control the temperature of the gaseous fluid that is injected into the interface region between the pump and the turbine. This control over the temperature of the gaseous fluid is provided by the bypass pipe. The bypass pipe makes it possible to tap off liquid propellant prior to being injected into the heat exchanger in order to reinject it into the outlet from the heat exchanger, thereby causing it to be mixed with the fluid that has been vaporized in the heat exchanger and of temperature, if it is too high, that is lowered on coming into contact with the liquid fluid.

Advantageously, the means for sharing the liquid fluid comprises an adjustable constriction on at least one of the elements constituted by the bypass pipe and a segment of the bleed pipe that extends between the bypass pipe and the heat exchanger.

The adjustable constriction makes it possible to adapt the quantity of liquid fluid that is transformed into gaseous fluid at the outlet from the heat exchanger, and thus to control the temperature of the gaseous fluid that results from mixing between the gaseous fluid coming from the heat exchanger and the liquid fluid coming from the bypass pipe, which mixture is then injected into the dynamic sealing system; this is done while taking account of the temperature of the hot gas in the exhaust pipe and of the capacity of the heat exchanger.

Advantageously, the bleed-and-injection circuit includes means for adjusting flow rate in the injection pipe.

Advantageously, the turbopump includes a helium feed circuit for injecting helium into at least one of the elements constituted by the pump and by the turbine, with helium injection advantageously taking place via the dynamic sealing system.

The helium flow circuit serves to provide sealing between the pump while cooling down the engine and the turbopump prior to igniting the engine. By means of the above-described provision, advantage is taken of a portion of this circuit for the purpose of injecting the anti-vibration gaseous fluid.

The use of this pre-existing helium flow system presents the advantage of avoiding any need to incorporate an additional flow system for passing the flow of gaseous fluid and then for injecting it into the interface region of the turbopump situated between the pump and the turbine, with injection taking place in particular via the dynamic sealing system.

BRIEF DESCRIPTION OF THE DRAWINGS

Other characteristics and advantages of the invention appear on reading the following description of a preferred embodiment of the invention, given by way of example and with reference to the accompanying drawings.

DETAILED DESCRIPTION OF THE INVENTION

Figure 1:
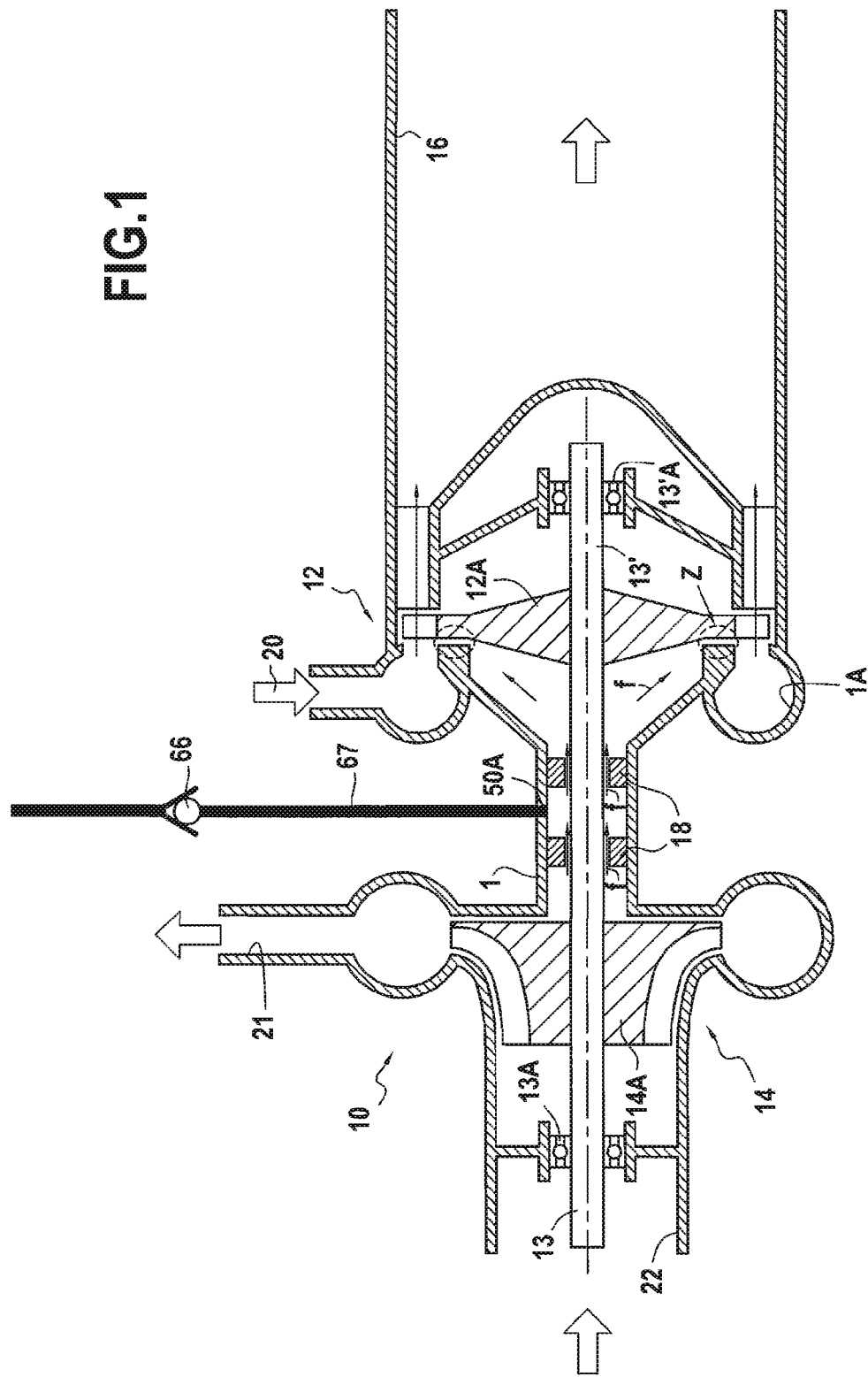
FIG. 1 is a section view showing a conventional turbopump (shown in simplified manner to facilitate understanding the invention).

FIG. 1 is a simplified view of a turbopump 10 comprising at least a pump 14 and a turbine 12 connected together by a common rotary shaft 13, 13'. This type of turbopump 10 is used in particular in liquid-propellant rocket engines in order to bring the propellants up to the pressure at which the propellants are injected into a combustion chamber of such an engine. In very diagrammatic manner, there can be seen the rotor 14a of the pump 14 and the rotary disk 12a of the turbine 12. Reference 1 designates the casing of the turbopump, which includes a pump casing portion and a turbine casing portion.

Rotation of the turbine 12 causes the shaft 13, 13' to rotate, thereby driving the rotor of the pump 14 in rotation for the purpose of pumping a liquid from a feed 22. By way of example, the turbine 12 is driven by a gas generator on board the rocket engine. This applies to turbopumps in which the turbine is actuated by the expansion of hot gas 20 generated by the gas generator.

Nevertheless, the turbine 12 of this type of turbopump could also be an expander cycle turbine. This applies to turbopumps in which the turbine is driven by the expansion of a propellant in the gaseous state after it has been heated via the wall of the combustion chamber.

The hot gas 20 that has driven the turbine 12 in rotation is exhausted via a hot gas exhaust pipe 16. The hot gas that drives rotation of the turbine may for example be gaseous hydrogen (expander cycle) or a mixture of gaseous hydrogen and steam (gas generator cycle).

By way of example, the pumped liquid fluid may be a propellant, and in particular liquid hydrogen, that the pump 14 raises to pressure at its outlet 21 for the purpose of injecting the propellant into a combustion chamber of an engine (not shown) associated with the turbopump.

The hot and gaseous environment of the turbine 12 is sealed from the cryogenic and liquid environment of the pump 14 by a dynamic sealing system 18 that co-operates firstly with the shaft 13, 13 and secondly with the casing 1 of the turbopump. In spite of this sealing, a small leak of liquid hydrogen is liable to flow from the pump environment 14 to the turbine environment 12, as represented by arrows f. This leakage liquid reaches the turbine casing portion upstream from the first disk of the turbine. It thus becomes mixed, in a zone Z marked in FIG. 1, with the hot gas leaving the upstream cavity 1A of the turbine.

Bearings 13A and 13'A support the shaft 13, 13 in rotation relative to the casing 1 of the turbopump.

Figure 2:
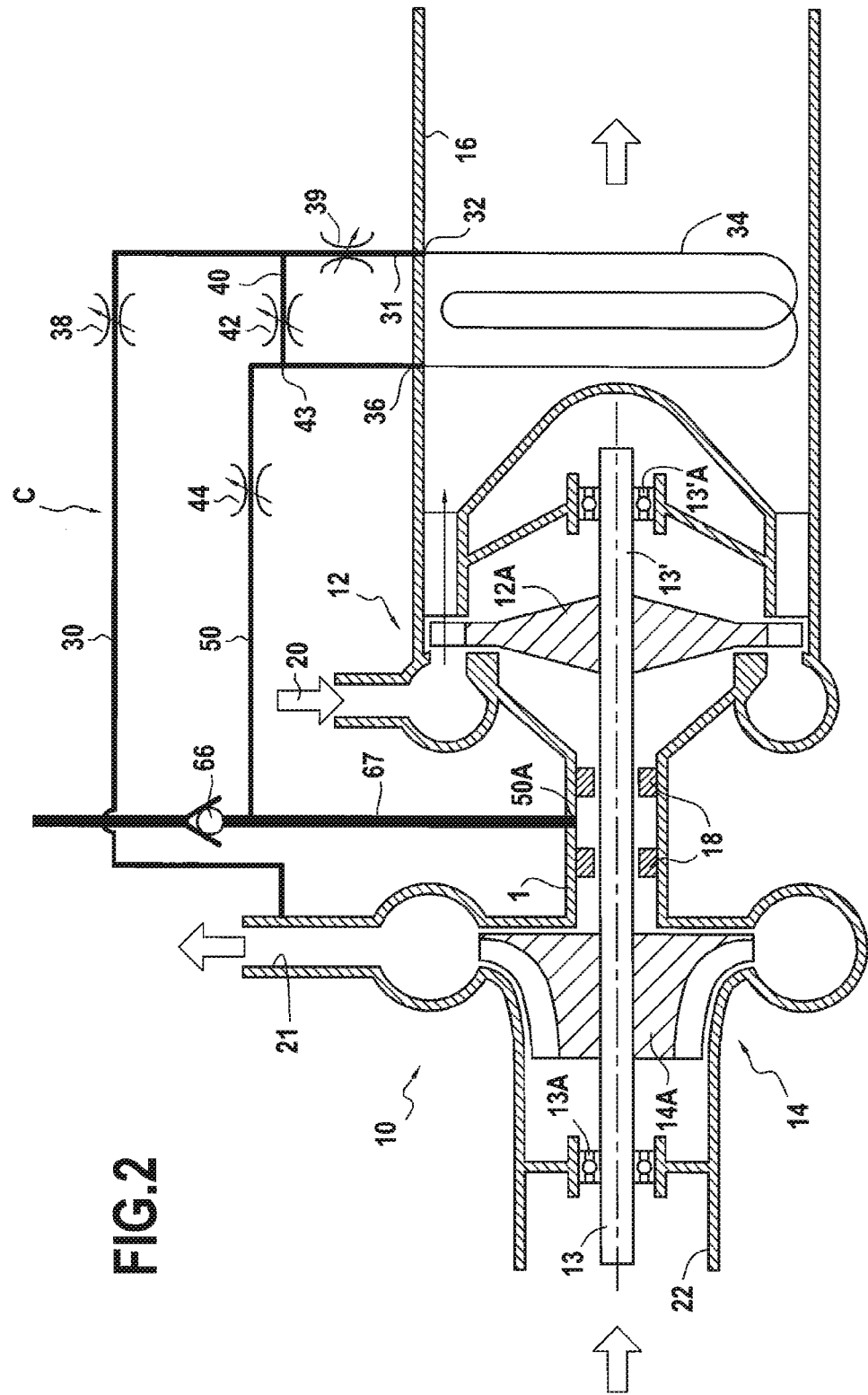
FIG. 2 is a section view of the same turbopump provided with the fluid recirculation system in an embodiment of the invention.

There follows a description of an embodiment of the invention, with reference to FIG. 2.

In the description below, reference is made, by way of example, to using a hot gas mixture of hydrogen and steam as the fluid flowing through the turbopump for rotating the turbine, and to using hydrogen in liquid form as the liquid fluid being pumped. Nevertheless, other types of fluid could be envisaged, e.g. depending on the type of propellant concerned.

In the invention, and as shown in FIG. 2, a bleed-and-injection circuit C is added to the FIG. 1 turbopump. This circuit has bleed means 30 that in the embodiment shown comprise a bleed pipe 30 bleeding liquid hydrogen at the outlet 21 from the pump 14. This liquid hydrogen is at a high outlet pressure, e.g. about 185 bars. The fluid bled through this bleed pipe 30 then reaches the inlet 32 of a heat exchanger 34, while it is still in liquid form, and it leaves the heat exchanger at 36 in gaseous form. The outlet 36 from the heat exchanger 34 is connected to an injection pipe 50 that leads into the dynamic sealing system 18 situated at the interface between the pump 14 and the turbine 12. Specifically, the dynamic sealing system has two gaskets that are axially spaced apart in the longitudinal direction of the shafts 13, 13', and injection takes place between these two gaskets.

Specifically, the heat exchanger 34 co-operates with the hot gas exhaust pipe 16 so as to enable it to be heated by the gas coming from the turbine exhaust. More precisely, the heat exchanger 34 is situated in a segment of the pipe 16.

The temperature of the liquid hydrogen at the net to the heat exchanger may for example be about 40 K. At the outlet from the heat exchanger 36, the hydrogen is gaseous as a result of being heated in the heat exchanger.

In the example shown, pressure regulator means 38 are situated on the liquid hydrogen bleed pipe 30. The pressure regulator means 38, e.g. a constriction of variable section, serves to reduce the pressure of the liquid hydrogen flowing in the pipe 30, e.g. to take it to a pressure of about 110 bars downstream from the constriction.

Provision could be made for all of the liquid hydrogen downstream from the pressure regulator means 38 to reach the inlet of the heat exchanger. Nevertheless, in the example shown, a bypass pipe 40 serves to bypass the heat exchanger 34 so that a portion of the fluid that has been bled off can pass directly from the bleed type 30 to the injection pipe 50. Under such circumstances, only a portion of the liquid hydrogen at low pressure is injected into the heat exchanger 34 in order to be heated, while the remaining portion passes directly into the injection pipe 50 without being heated. It can be understood that the relative proportions of heated hydrogen and of non-heated hydrogen determine the temperature of the gaseous fluid that results from mixing them together and that is injected into the region of the dynamic sealing system 18.

In order to adjust these proportions, the fluid bleed and injection circuit has means for sharing the liquid hydrogen between the heat exchanger and the bypass pipe. These means may comprise flow sharing means between the bypass pipe 40 and the segment 31 of the bleed pipe 30 that extends between the bypass pipe 40 and the inlet 32 of the heat exchanger. They may merely comprise a flow rate limiter situated on the bypass pipe 40 or on the segment 31. In the example shown, flow rate adjustment means 39 of the adjustable section constriction type are provided on the segment 31, and flow rate adjustment means 42 of adjustable section constriction type are provided on the bypass pipe 40.

The adjustable constriction 38 serves to adjust the pressure at the inlet to the heater device. The constrictions 39 and 42 serve to adjust the proportion of the fluid that is heated and vaporized in the heat exchanger compared with the proportion that remains liquid and cold, thus making it possible to adjust the temperature of the fluid injected by the pipe 50, e.g. in order to obtain a temperature of about 300 K. Under all circumstances, the proportions are such that the fluid leaving the pipe 50 is in gaseous form.

In the example shown, the injection pipe 50 also has means 44 for adjusting the rate at which gaseous hydrogen is injected, e.g. a constriction of adjustable section. These adjustment means are situated in the downstream portion of the pipe 50, downstream from the connection node 43 between the bypass pipe 40 and the outlet from the heat exchanger. By way of example, this ensures that the gaseous hydrogen is injected into the dynamic sealing system 18 at a flow rate of about 7 grams per second (g/s).

Figure 3:
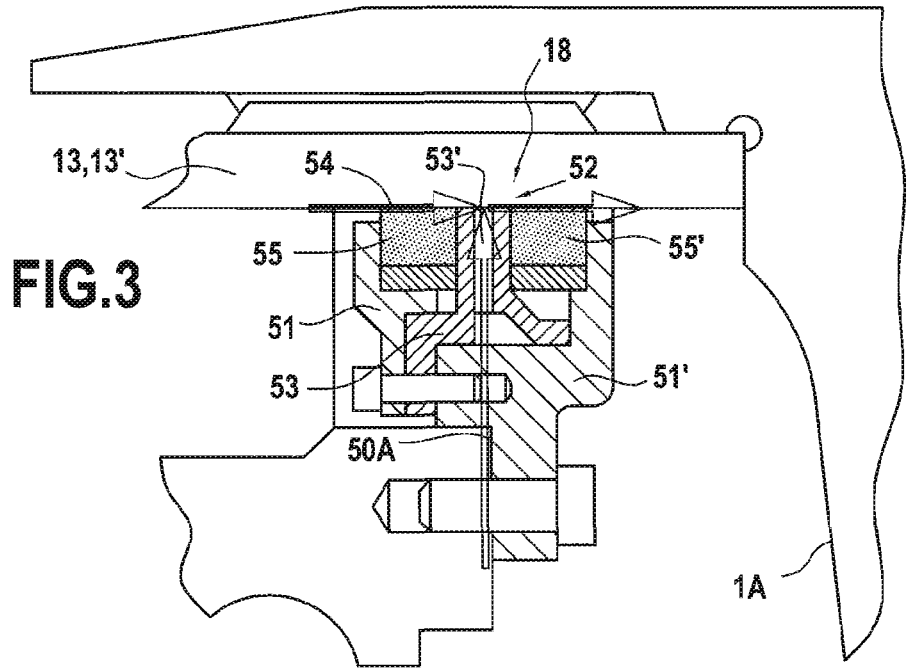
FIG. 3 is a detail view of the interface region between the pump and the turbine of the turbopump, shown in the zone into which, in accordance with the invention, the gaseous fluid coming from the fluid that has been bled off is injected.

FIG. 3 shows the dynamic sealing system 18 in detail.

This figure is a diagram showing the location of the end 50A of the injection pipe 50 as described above with reference to FIG. 2. As can be seen, this end 50A leads into the region of the dynamic sealing system 18 in order to inject gaseous hydrogen into that location. More particularly, the injection at the outlet from the end 50A takes place at a location referred to as the "inter-ring" location 52 of the dynamic sealing system 18. This inter-ring location 52 is situated between two sealing gaskets, respectively referenced 55 and 55', that are held by two flanges, respectively referenced 51 and 51', and by a spacer 53. The gaseous hydrogen from the injection pipe 50 is injected between the two gaskets 55 and 55' via holes 53' that are pierced radially through the spacer 53.

A small leakage flow of liquid hydrogen 54 comes from the environment of the pump and flows towards the environment of the turbine.

This small flow of liquid hydrogen 54 is vaporized as it comes into contact with the gaseous hydrogen. Thus, all of the leakage fluid is vaporized.

The mixing between the leakage liquid fluid and the gaseous fluid injected into the inter-ring location 52 takes place in the downstream region of the inter-ring location 52, where "downstream" is in the flow direction of the gaseous fluid injected by the pipe 50. Specifically, mixing takes place in the gaps between the spacer 53 and the shafts 13, 13'. The pressure at which the gaseous hydrogen is injected into the inter-ring location 52 is of the order of 35 bars, for example.

Figure 4:
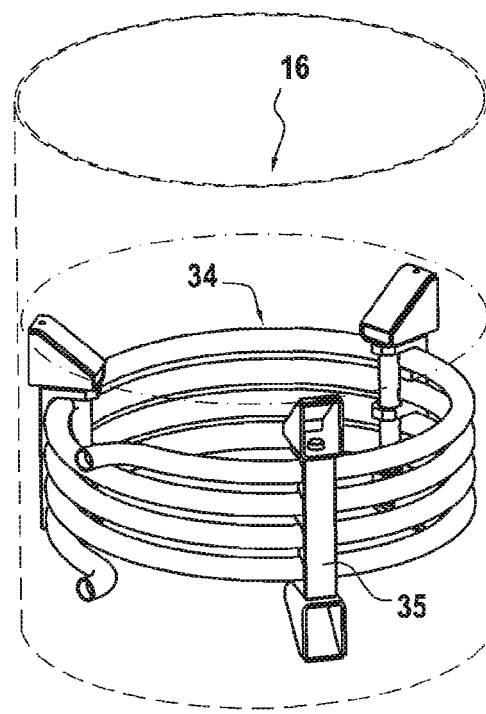
FIG. 4 is a diagrammatic view of a heat exchanger in an embodiment of the invention.

FIG. 4 is a diagrammatic view of the heat exchanger 34 situated in the hot gas exhaust pipe 16. This heat exchanger 34 is preferably held by attachments 35 that withstand thermal expansion.

The heat exchanger 34 is in the form of a coil. It could have other shapes appropriate for a heat exchanger.

Nevertheless, and byway of example, when the heat exchanger 34 is in the form of a coil, it presents: a thickness of about 1 millimeter (mm), and it is helically wound so as to form a plurality of turns.

The temperature inside the hot gas exhaust pipe 16 usually lies in the range about 600 K to about 700 K.

The injection pipe 50 uses a portion of the helium flow circuit in the turbopump. In the example shown, the turbopump includes a helium feed connected to the dynamic sealing system 18 that provides sealing for the pump during the stage prior to igniting the engine that the turbopump 10 is to feed; this stage is known as the stage of cooling down the engine. No propellant leak between the pump 14 and the turbine 12 is acceptable during this stage.

As can be seen in FIG. 2, the injection pipe 50 includes the terminal segment 67 of the pipe for feeding the dynamic sealing system with helium. Thus, a portion of the helium flow circuit is reused for making a portion of the bleed-and-injection circuit of the invention. It should be observed that the segment 67 includes a check valve 66 that is situated upstream from its connection to the injection pipe 50 so as to prevent hydrogen coming from the pipe 50 penetrating into the helium delivery circuit.

The gaseous hydrogen is introduced into the helium feed circuit of the turbopump 10 after its engine has been ignited, once the pressure at the outlet from the pump reaches a sufficient value. The gaseous helium and hydrogen thus coexist in the same circuit for a few seconds. Once this time has elapsed, only gaseous hydrogen flows in the segment 67.

It should be observed that flexible portions may be provided on the above-described pipes (in particular the bleed pipe 30 and the injection pipe 50) in order to absorb relative movements between these pipes 30 and 50 within the turbopump 10.

The invention claimed is:

1. A turbopump, comprising:
   a casing;
   a turbine fed with hot gas;
   a pump driven by the turbine via a shaft and fed with liquid fluid;
   a hot gas exhaust pipe situated downstream from the turbine; and
   a bleed-and-injection circuit comprising
      a bleed pipe adapted to bleed a liquid fluid at an outlet from the pump,
      a heat exchanger adapted to heat the liquid fluid as bled off so as to transform the liquid fluid into gaseous fluid, and
      an injector pipe adapted to inject the gaseous fluid into an interface region of the turbopump situated between the pump and the turbine,
   wherein the gaseous fluid is injected directly between first and second dynamic seals that define a dynamic sealing system that cooperates with the shaft and with the casing of the turbopump, which dynamic sealing system is located in an interface region situated between the pump and the turbine.

2. The turbopump according to claim 1, wherein the turbine is fed with hot gas and the pump is fed with liquid hydrogen.

3. The turbopump according to claim 1, wherein the bleed pipe extends from the outlet of the pump to an inlet of the heat exchanger cooperating with the exhaust pipe, and the injection pipe extends from an outlet of the heat exchanger to the interface region.

4. The turbopump according to claim 3, wherein the heat exchanger comprises a fluid flow chamber with a wall situated in the hot gas exhaust pipe.

5. The turbopump according to claim 4, wherein the flow chamber is coil shaped.

6. The turbopump according to claim 3, wherein the bleed-and-injection circuit includes a constriction for controlling a flow of the liquid fluid in the bleed pipe.

7. The turbopump according to claim 6, wherein the constriction adjusts a fluid pressure in the bleed pipe.

8. The turbopump according to claim 3, wherein the bleed-and-injection circuit includes a bypass pipe for bypassing the heat exchanger between the bleed pipe and the injection pipe, and an adjustable constriction for sharing the liquid fluid between the bypass pipe and the heat exchanger.

9. The turbopump according to claim 8, wherein the adjustable constriction is provided on at least one of the bypass pipe and a segment of the bleed pipe that extends between the bypass pipe and the heat exchanger.

10. The turbopump according to claim 3, wherein the bleed-and-injection circuit includes a constriction for adjusting flow rate in the injection pipe.

11. The turbopump according to claim 1, further comprising a helium flow circuit for injecting helium into at least one of the pump and the turbine.

12. The turbopump according to claim 11, wherein the helium is injected via the dynamic sealing system.

13. The turbopump according to claim 1, wherein the first dynamic seal includes a first sealing gasket held by a first flange and a spacer, the second dynamic seal includes a second sealing gasket held by a second flange and the spacer, and the gaseous fluid is injected from the injector pipe in a location between the first and second sealing gaskets via holes that are radially pierced through the spacer.

14. The turbopump according to claim 13, wherein a first radial end of the spacer is sandwiched between the first sealing gasket and the second sealing gasket, a second radial end of the spacer is sandwiched between the first flange and the second flange, and the holes are radially pierced through the first radial end of the spacer.

* * * * *